United States Patent
Porath

(10) Patent No.: US 10,406,876 B1
(45) Date of Patent: Sep. 10, 2019

(54) PROTECTIVE SEALING PLUG SYSTEM FOR TOWING HITCH RECEIVERS WITH SELF LUBRICATING STORAGE CONTAINER

(71) Applicant: Steven Hugh Porath, Painesville, OH (US)

(72) Inventor: Steven Hugh Porath, Painesville, OH (US)

(*) Notice: Subject to any disclaimer, the term of this patent is extended or adjusted under 35 U.S.C. 154(b) by 0 days.

(21) Appl. No.: 15/285,406

(22) Filed: Oct. 4, 2016

Related U.S. Application Data

(63) Continuation-in-part of application No. 14/489,519, filed on Sep. 15, 2014.

(51) Int. Cl.
*B60D 1/60* (2006.01)
*B60D 1/06* (2006.01)

(52) U.S. Cl.
CPC ............... *B60D 1/605* (2013.01); *B60D 1/06* (2013.01)

(58) Field of Classification Search
CPC .................................. B60D 1/60; F16L 55/132
USPC .......... 411/22, 30, 34; 49/645, 499.1, 498.1, 49/493.1, 472, 463, 466
See application file for complete search history.

(56) References Cited

U.S. PATENT DOCUMENTS

| | | | | |
|---|---|---|---|---|
| 2,466,013 A | * | 4/1949 | Eaton | F16B 19/1027 29/464 |
| 2,978,138 A | * | 4/1961 | Moeller | B63B 13/00 114/197 |
| 3,192,820 A | * | 7/1965 | Pitzer | F16B 13/065 279/2.12 |
| 3,651,651 A | * | 3/1972 | Triplett | E21D 21/008 405/259.3 |
| 3,750,822 A | * | 8/1973 | Dubach | B65D 39/12 215/361 |
| 4,040,641 A | * | 8/1977 | Riecke | B60D 1/60 280/507 |
| 4,369,813 A | * | 1/1983 | Thomas | F16L 55/124 138/89 |
| 4,415,005 A | * | 11/1983 | Janzen | E21B 17/006 138/89 |
| 4,877,362 A | * | 10/1989 | Berecz | B29C 65/602 411/34 |
| 5,011,319 A | * | 4/1991 | Levi | F16B 7/1427 403/109.5 |

(Continued)

*Primary Examiner* — Joseph M Rocca
*Assistant Examiner* — Daniel S Yeagley

(57) ABSTRACT

A protective sealing plug system for towing hitch receivers is provided having a main body for fittingly engaging within the cavity of a towing hitch receiver. The body is formed of a series of aligned segments each formed of a resilient or flexible material that retain oils or other corrosion inhibiting substances and hold them in place against the inside of the female receiver tube. A mechanism for urging the flexible material to compress slightly and, in the process, each segment expands slightly to allow engagement within the hitch receiver in a manner that both prevents access by outside elements, but also prevents egress of the main body from the hitch receiver until desired by the user. When installed in the female hitch receiver, the expansion of the resilient body will seal the female receiver tube and prevent the ingress of water, dirt or other damaging elements. Retraction of the resilient body will cause the flexible body to retract, allowing removal from the receiver hitch.

13 Claims, 23 Drawing Sheets

(56) References Cited

U.S. PATENT DOCUMENTS

| | | | |
|---|---|---|---|
| 5,168,902 A * | 12/1992 | Hood | F16L 55/132 138/89 |
| 5,353,691 A * | 10/1994 | Haber | A61M 5/31513 92/159 |
| 5,433,270 A * | 7/1995 | LaFleur | E21B 33/16 166/152 |
| 5,437,310 A * | 8/1995 | Cunningham | F16L 55/1141 138/89 |
| D426,798 S | 6/2000 | Peroni | |
| 6,086,438 A * | 7/2000 | Wang | B60D 1/60 440/49 |
| 6,260,874 B1 * | 7/2001 | Smith | B60D 1/60 280/507 |
| 7,125,035 B1 * | 10/2006 | Huenefeld | B60D 1/58 280/507 |
| 7,455,313 B2 | 11/2008 | Yokosh et al. | |
| D623,099 S | 9/2010 | Wise | |
| 8,037,904 B2 * | 10/2011 | Carnevali | F16L 55/132 138/89 |
| 8,137,039 B2 * | 3/2012 | Liang | E05D 5/0276 292/257 |
| 8,220,820 B2 | 7/2012 | Bow | |
| 8,256,467 B1 * | 9/2012 | Larson | F16K 7/10 137/226 |
| 8,475,167 B2 | 7/2013 | Dunn | |
| 8,596,941 B2 * | 12/2013 | Marlow | B60Q 1/2634 292/257 |
| 2004/0074549 A1 * | 4/2004 | Allen | F16L 55/132 138/89 |
| 2009/0269651 A1 * | 10/2009 | Yoshihiro | H01M 8/04201 429/515 |
| 2012/0155599 A1 * | 6/2012 | Sprague | F16L 55/132 376/392 |
| 2014/0099602 A1 * | 4/2014 | Courvoisier | A61C 8/0089 433/173 |

* cited by examiner

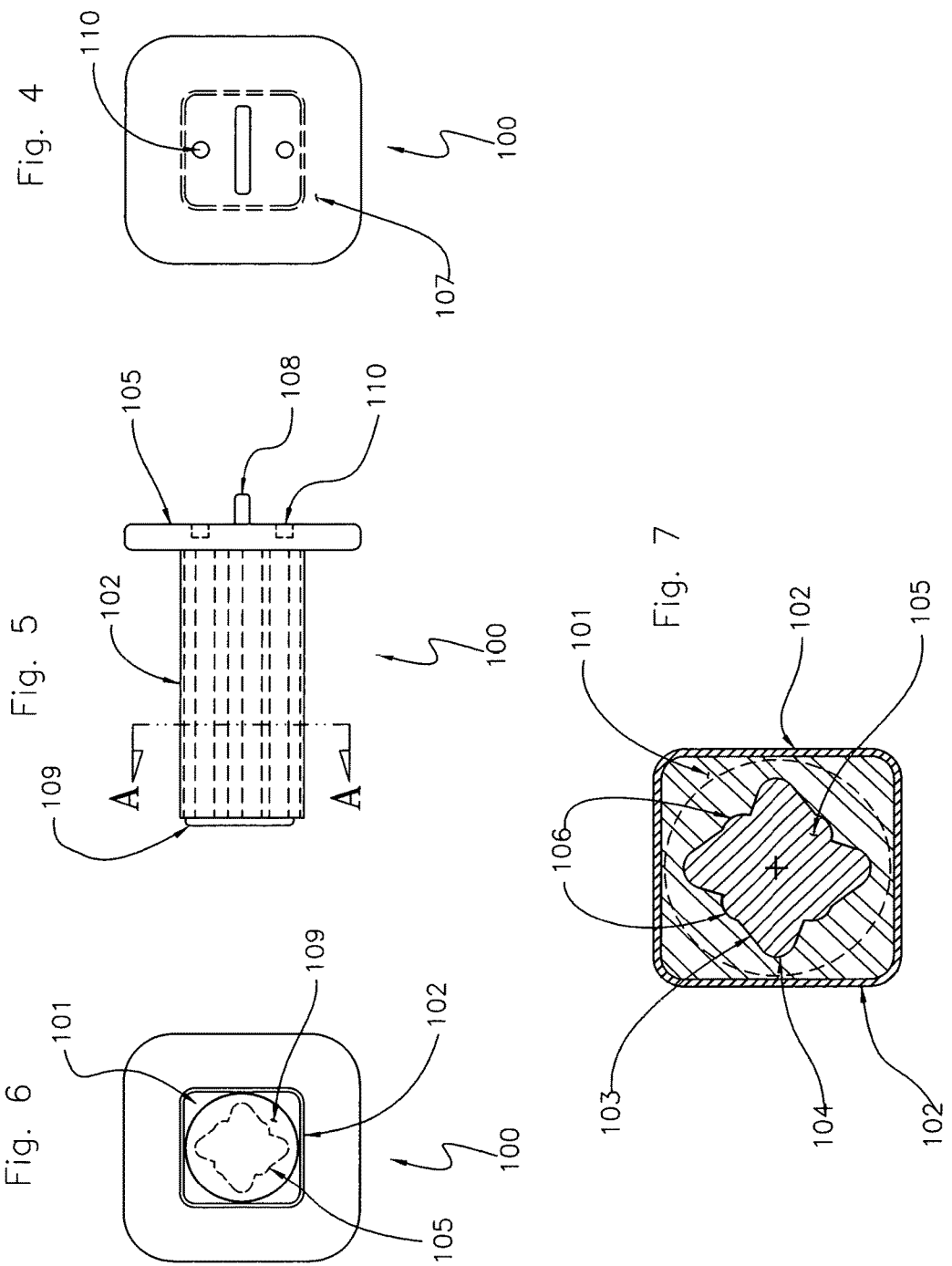

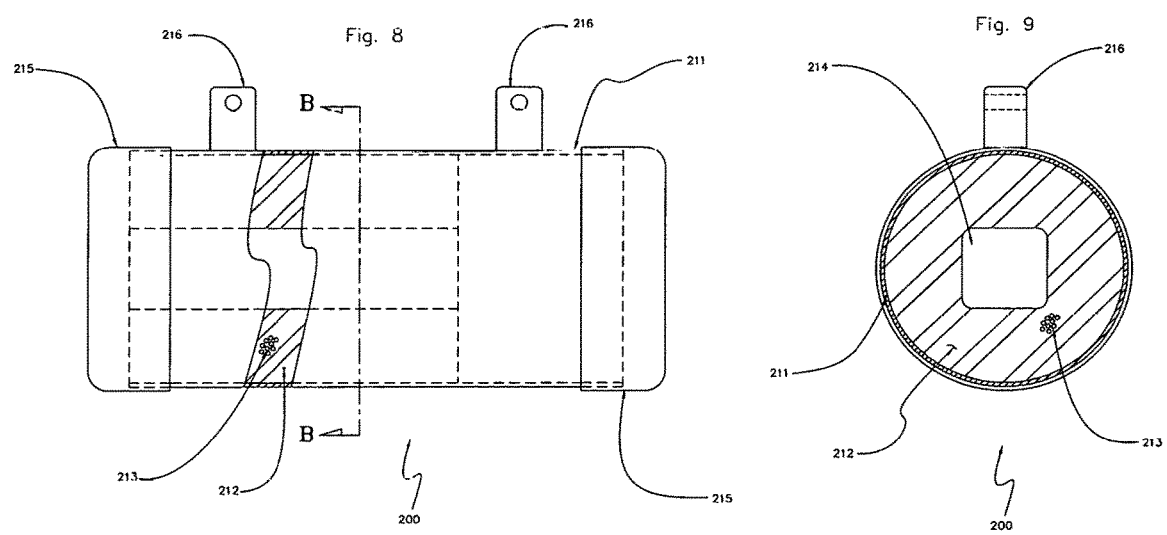

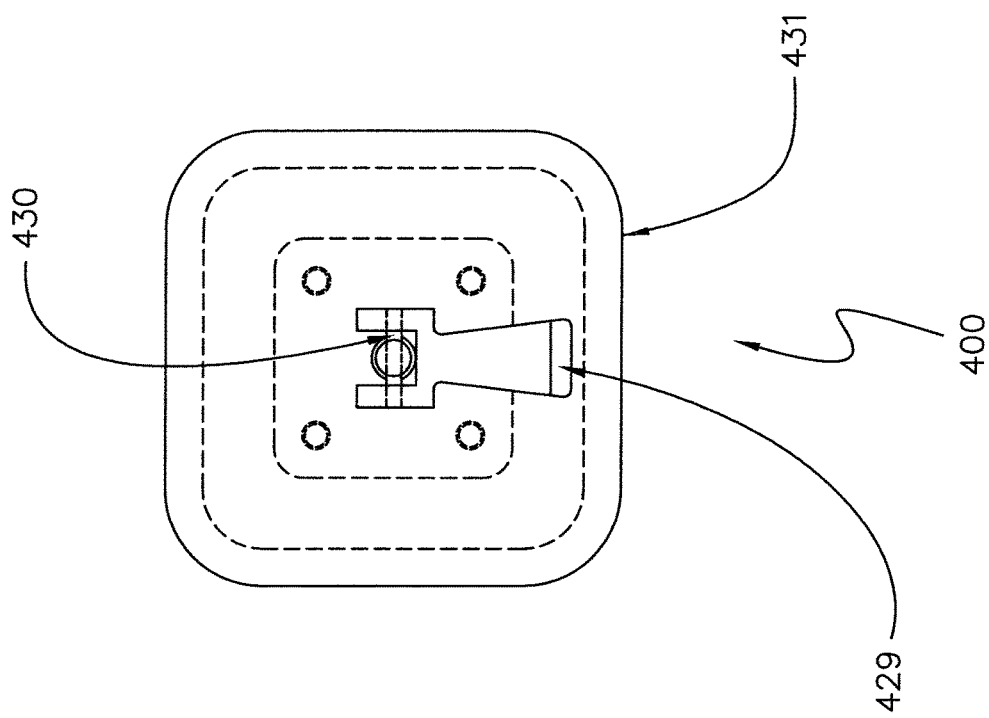

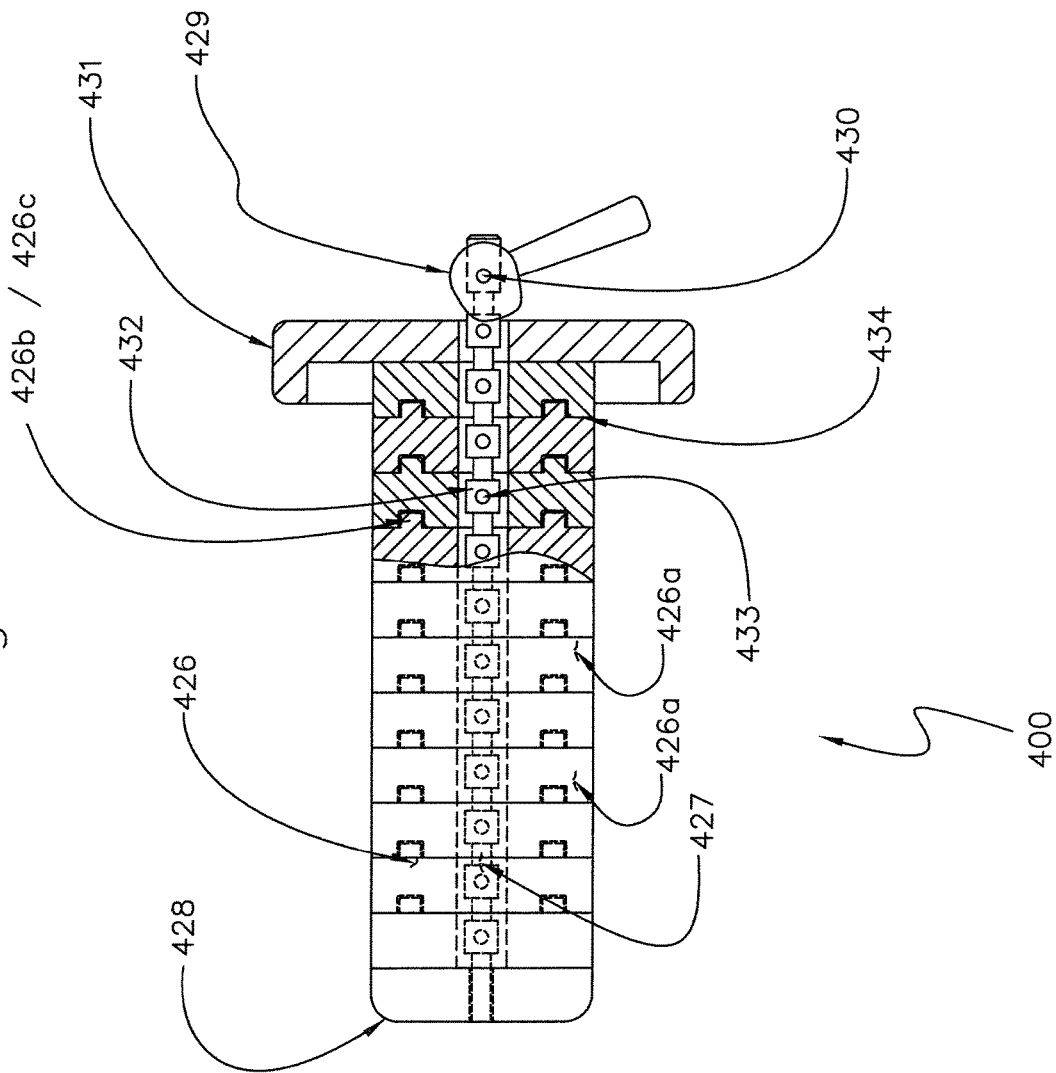

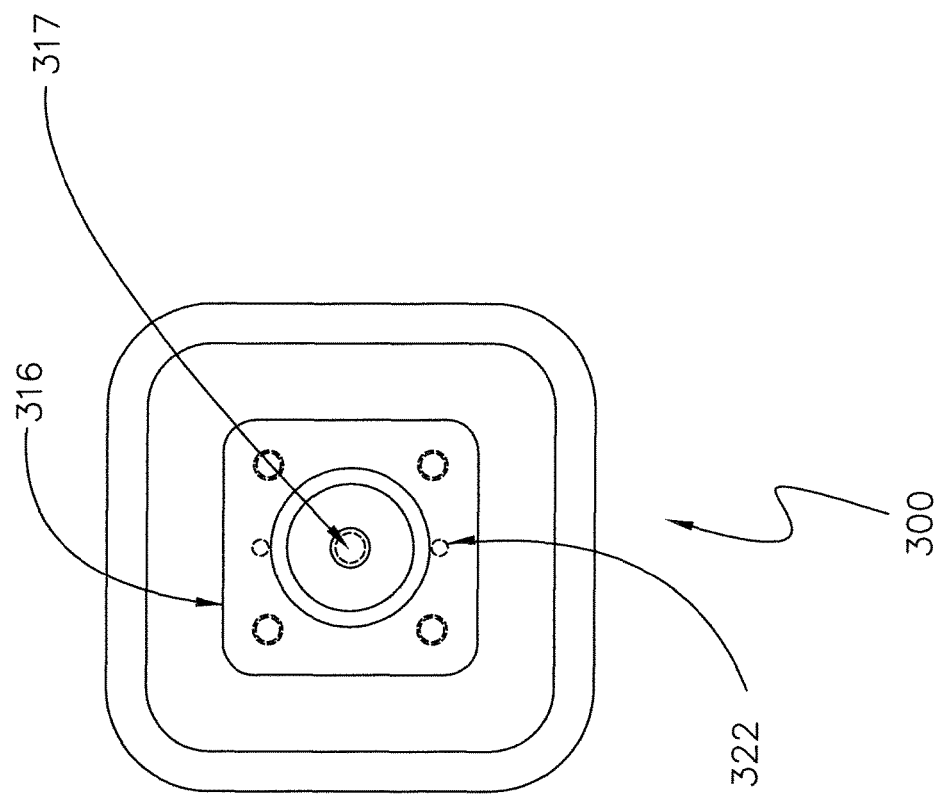

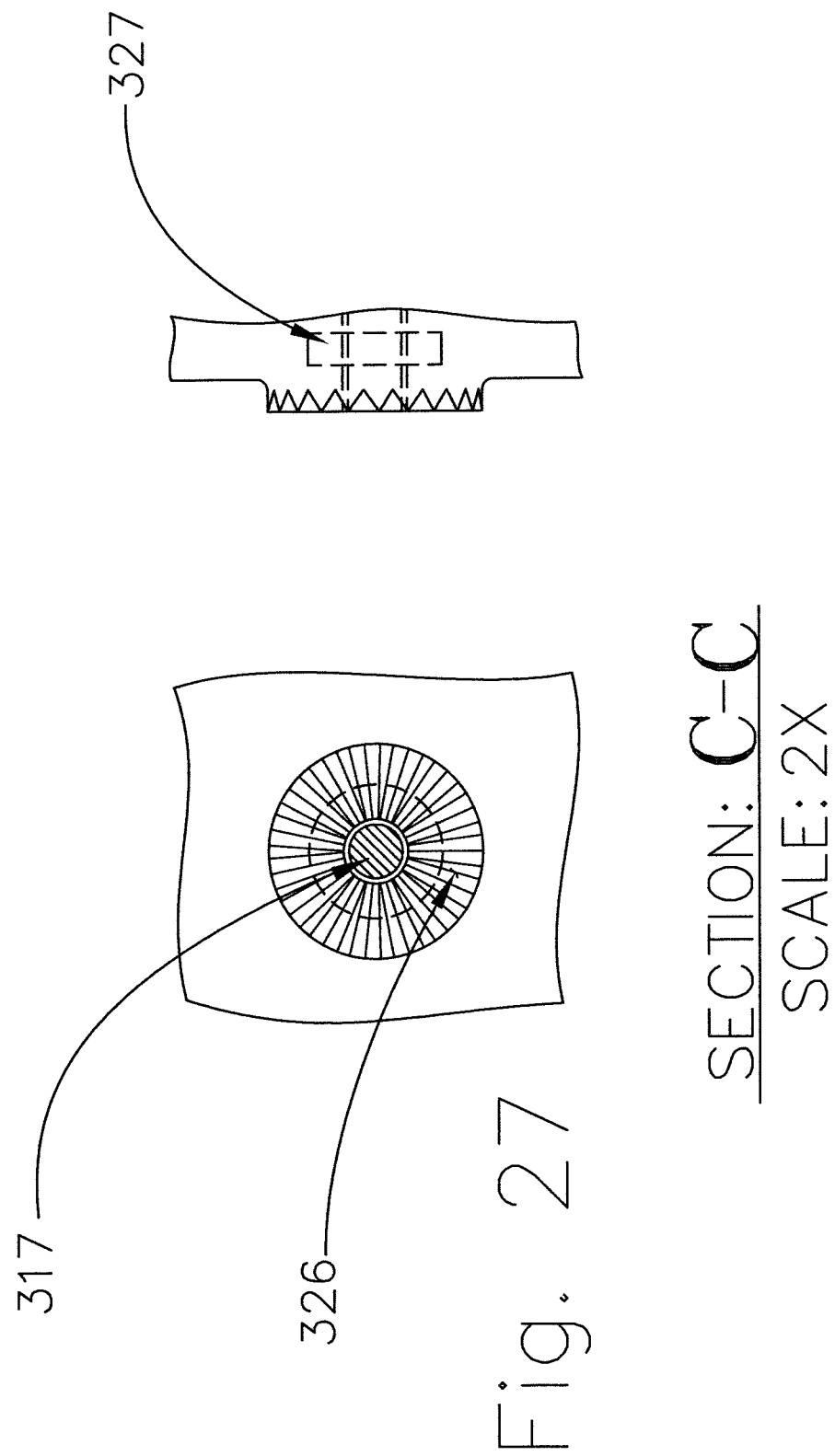

PROTECTIVE SEALING PLUG SYSTEM FOR TOWING HITCH RECEIVERS WITH SELF LUBRICATING STORAGE CONTAINER

RELATED APPLICATIONS

The present application is a continuation in part of U.S. Ser. No. 14/489,519, filed on Sep. 15, 2014, which is incorporated by reference as if fully rewritten herein.

BACKGROUND OF THE INVENTION

1. Field of the Invention

The present invention relates to vehicle trailer hitches and, more particularly, to a sealing plug system to protect and seal the female components of a trailer hitch receiver from corrosion, moisture and dirt.

2. Description of the Related Art

Trailer hitch receivers are metal assemblies that are located under a vehicle. The purpose of a trailer hitch receiver is to allow the towing vehicle to be coupled to the item being towed and effectively transfer the towing forces to the frame of the towing vehicle. These are generally fabricated from metal tubes and plates and located at the rear of the vehicle under the chassis. They typically are made of carbon steel and are painted or powder coated to prevent corrosion. Referring to FIG. 1 and FIG. 2, a typical welded steel hitch receiver assembly and its related components are shown according to the PRIOR ART.

The primary feature of the trailer hitch receiver is a female tube that is designed to mate with a male ball mount bar. This male bar slides into the female tube of the hitch receiver and is secured with a hitch pin. The hitch pin slides through aligned holes in the male bar and female receiver, locking the components together.

Typically, the hitch pin is then retained with a metal clip that slides through a hole cross drilled in the hitch pin. The male ball mount bar will have a mating feature such as a trailer towing ball or other device that will allow the bar to couple to the trailer. This hitch system construction allows for easy interchangeability of the male bar and facilitates easy removal of the male bar for storage. Typically the male ball mountbar is removed from the hitch receiver when not in use, as its protrusion from the edge of the vehicle creates a dangerous tripping and impact hazard for people walking near the vehicle. By the nature of its design, the trailer hitch system requires that the mating action between the female hitch receiver tube and the male ball mount bar be undisturbed.

Through its normal exposure to the elements, the hitch receiver assemblies corrode. This can be exaggerated in mid west area in the United States known as "The Rust Belt" where rock salt and other corrosive chemicals are spread on the roads during the winter season to melt snow. Furthermore, the rattling and sliding of the male bar within the female receiver during normal operation scratches the paint from the inside of the female receiver tube, thereby exposing the the metal to the elements which allows for the rusting and corroding of the metals. Consequently, the build up of corrosion within the female receiver tube inhibits and interferes with the normal installation of the male ball mount bar. It is not uncommon for it to be impossible to insert the male ball mount bar into the female receiver tube after its extended exposure to the elements.

The functionality of the female hitch receiver tube can also be inhibited by dirt. Off road driving enthusiasts often find their receiver tubes plugged with dirt and mud after driving their vehicle. These sporting enthusiasts enjoy crossing rivers and climbing sand dunes and often scrape the bottom of the vehicle in the mud. This can plug the female receiver tube as mud is easily forced into the open end of the tube. This makes installation of the male ball mount bar impossible. Snow can also impact itself into an unsealed receiver tube impeding the installation of the male bar.

There are countless numbers of manufacturers today that produce and market a trailer receiver plug or cap. Generally, these are made of injection molded plastic and are designed to snap into the mating open end of the female hitch receiver tube. They may have a foam gasket that helps to seal the one end of the receiver tube. There is also usually a large flat molded surface that allow for display of advertising or decorative logo. Some of the current art caps may even have lights that function as a stop light when wired into vehicle electrical harness. These caps are typically inexpensive promotional give-a-ways that do little to protect the receiver from the elements. These designs do not effectively seal the receiver tube. They do nothing to seal the open far end of the receiver tube or the holes located in the female receiver tube that accepts the hitch pin. Water, salt, deicing chemicals and dirt are all free to enter into the receiver tube and corrode the mating surfaces. A typical example of the PRIOR ART is shown at FIG. 3, as manufactured by the REESE™ manufacturing company.

Consequently, a need exists for providing a structure that actually seals and protects a hitch receiver cavity from obstruction and/or corrosion.

SUMMARY OF THE INVENTION

It is a general object of the present invention to provide a sealing plug system to protect and seal the female components of a trailer hitch receiver from corrosion, moisture and dirt.

It is a feature of the present invention to provide a resilient body that fittingly engages within the receiver of a trailer hitch in a manner that prevents intrusion of exterior elements.

An additional feature of the present invention provides a lubricant or oil inhibiting substances within the resilient body such as to facilitate future engagement of a trailer hitch within the hitch receivers cavity.

The present invention provides a protective sealing plug system for towing hitch receivers having a main body for fittingly engaging within the cavity of a towing hitch receiver. The body is formed of a resilient or flexible material such as either self-skinning molded urethane foam or an extruded foam or a hot wire cut foam or other flexible material. The body material retain oils or other corrosion inhibiting substances and hold them in place against the inside of the female receiver tube. A mechanism for urging the flexible material to compress slightly and, in the process, expand slightly allows the main body to be engaged within the hitch receiver in a manner that both prevents access by outside elements, but also prevents egress of the main body from the hitch receiver until desired by the user.

When installed in the female hitch receiver, the expansion of the resilient body will seal the female receiver tube and prevent the ingress of water, dirt or other damaging elements. Retraction of the resilient body will cause the flexible body to retract, allowing removal from the receiver hitch.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4 is a front elevational view of a protective sealing plug system for towing hitch receivers according to the preferred embodiment of the present invention;

FIG. 5 is a side elevational view thereof;

FIG. 6 is a rear elevational view thereof;

FIG. 7 is a cross sectional view taken along line A-A of FIG. 5;

FIG. 8 is a side elevational view of a preferred embodiment of the self-lubricating storage container for protective sealing plug system of FIG. 4-7;

FIG. 9 is a cross sectional view taken along line B-B of FIG. 8;

FIG. 10 is a partial front elevational view of a protective sealing plug system for towing hitch receivers according to a first alternate embodiment of the present invention;

FIG. 11 is a side elevational view thereof;

FIG. 26 is a rear elevational view thereof; and

FIG. 27 is a cross sectional view taken along line C-C of FIG. 25.

DESCRIPTION OF THE PREFERRED EMBODIMENTS

Figure 1:
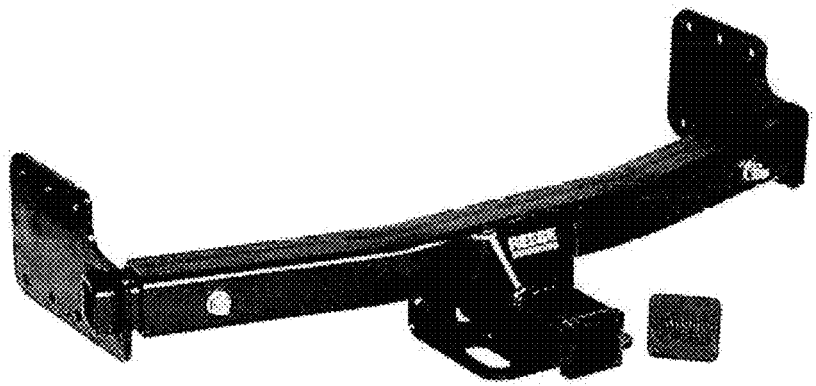
FIG. 1 depicts a rear perspective view of a receiver hitch assembly according to the PRIOR ART.
Figure 2:
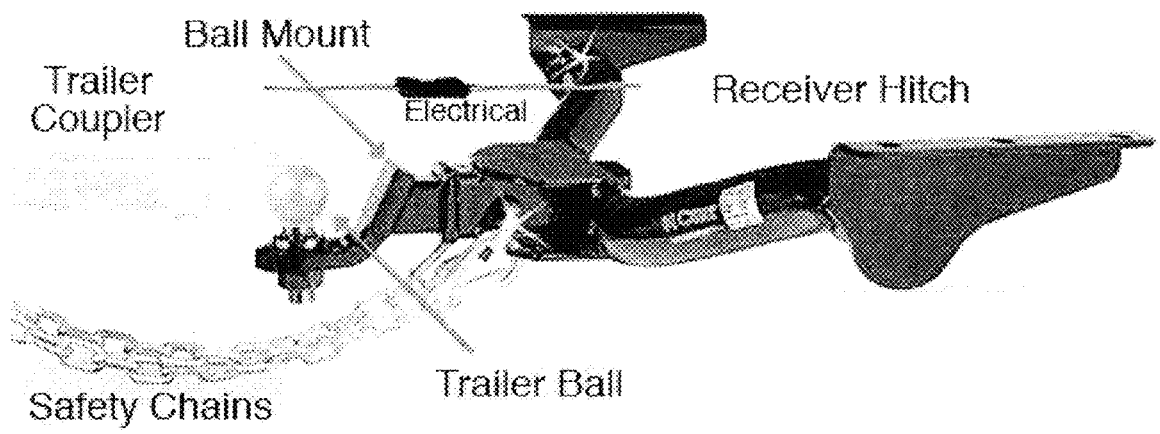
FIG. 2 depicts a side perspective view of a receiver hitch assembly according to the PRIOR ART.
Figure 3:
FIG. 3 is a front perspective view of a trailer receiver plug or cap according to the PRIOR ART.
Figure 12:
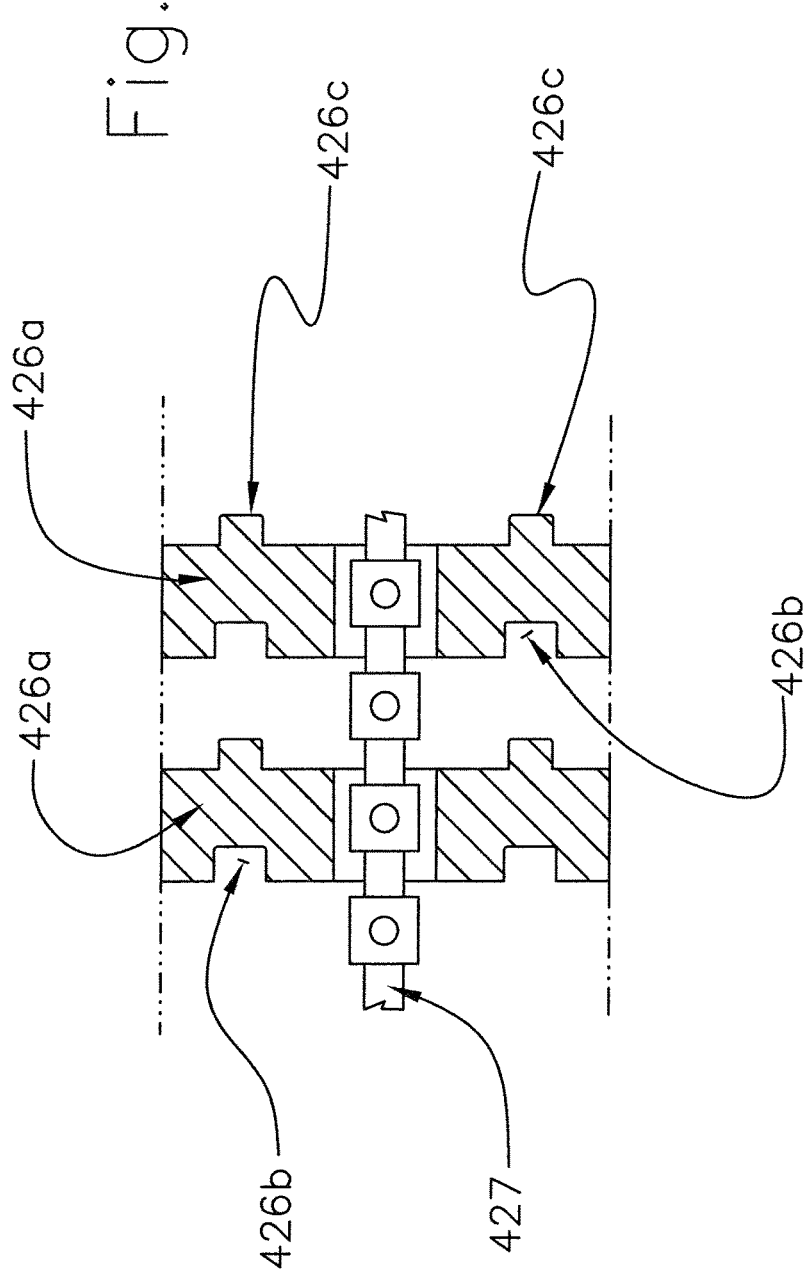
FIG. 12 is a partial detailed exploded side elevational view thereof.
Figure 13:
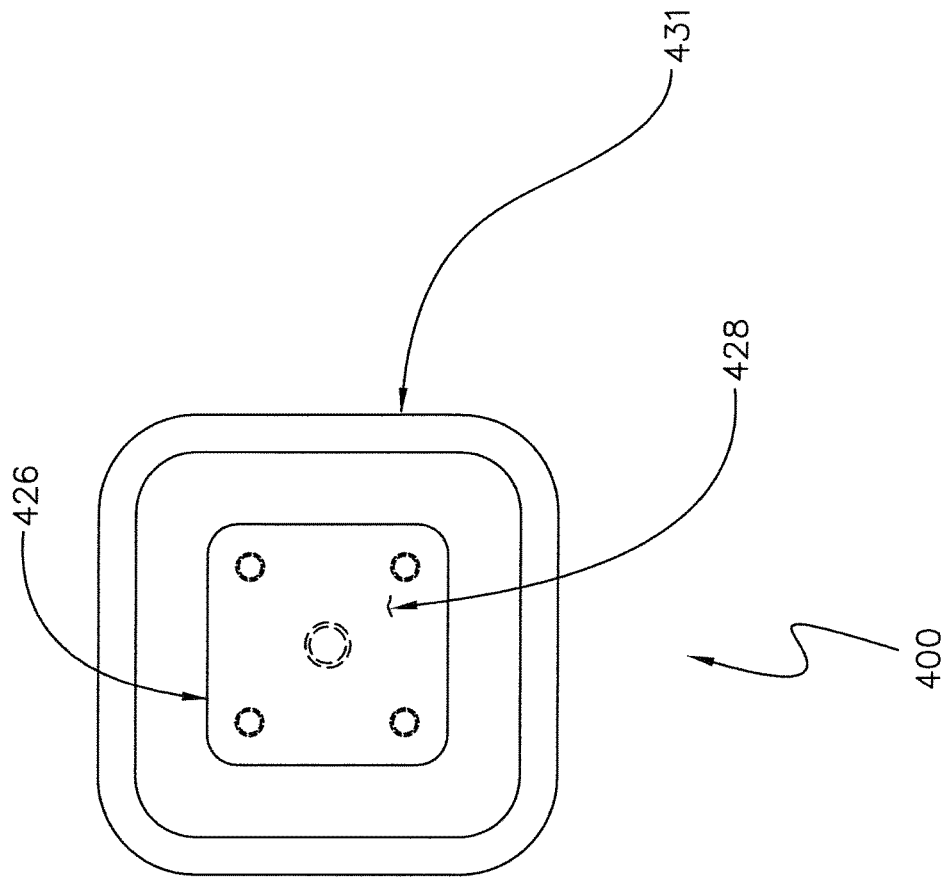
FIG. 13 is a rear elevational view thereof.
Figure 14:
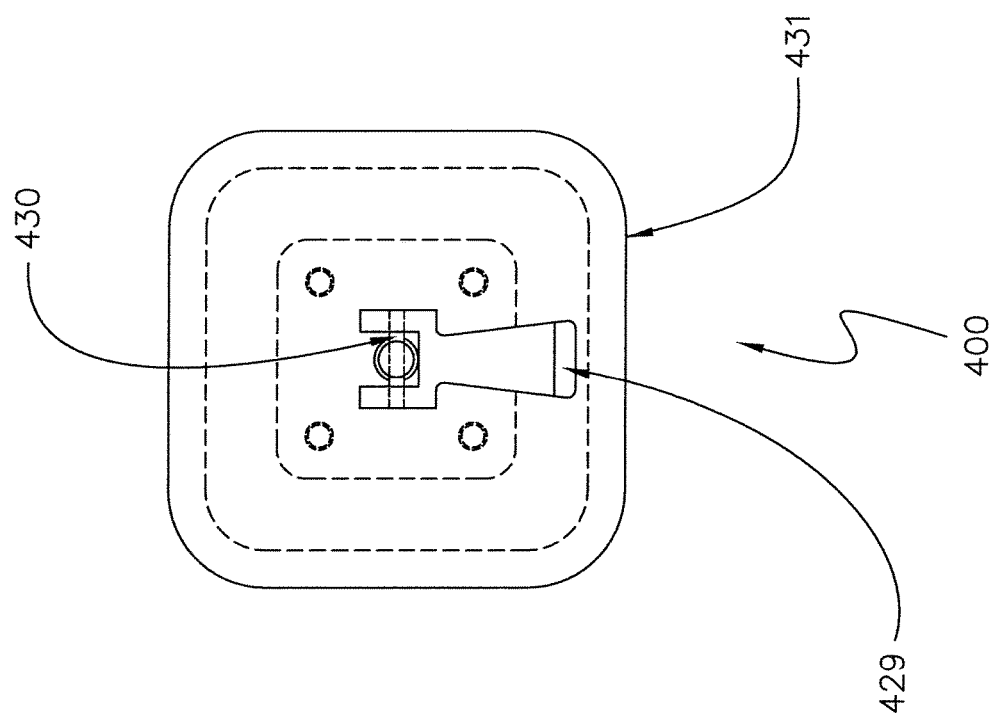
FIG. 14 is a partial front elevational view of a protective sealing plug system for towing hitch receivers according to a second alternate embodiment of the present invention.
Figure 15:
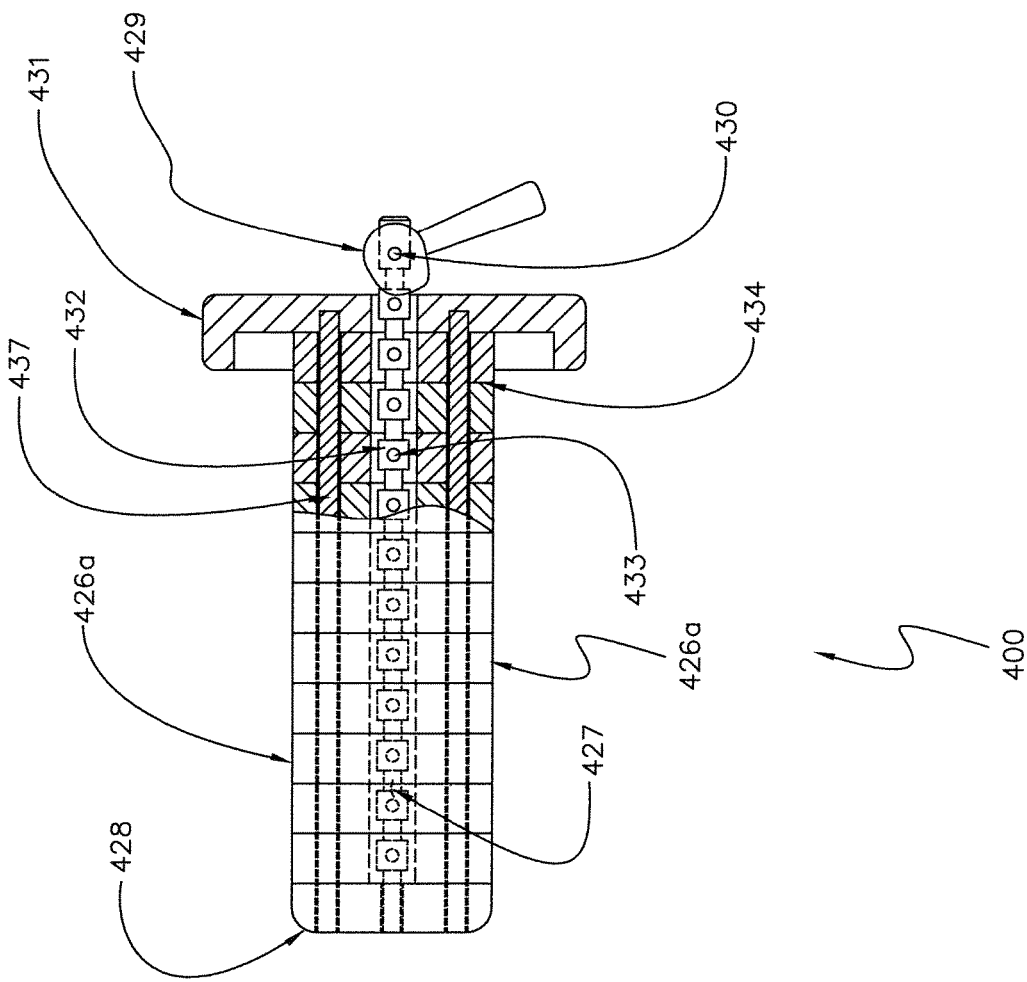
FIG. 15 is a side elevational view thereof.
Figure 16:
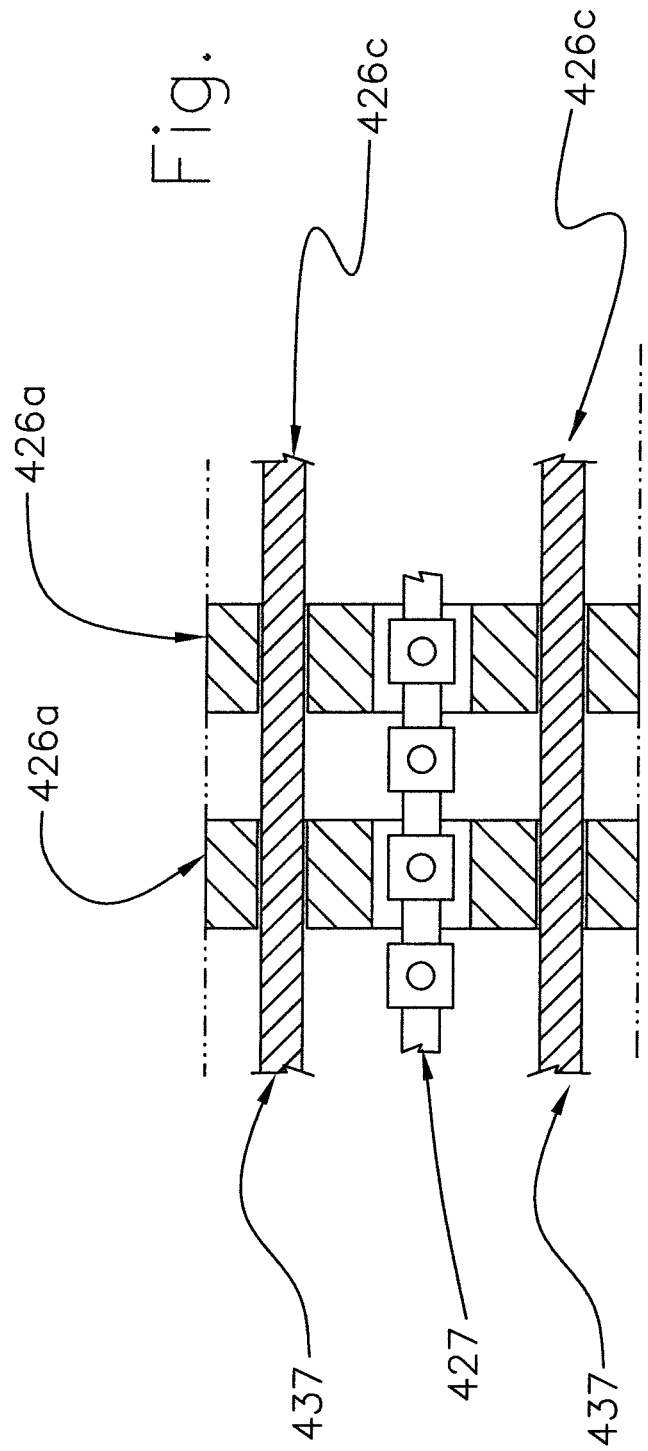
FIG. 16 is a partial detailed exploded side elevational view thereof.
Figure 17:
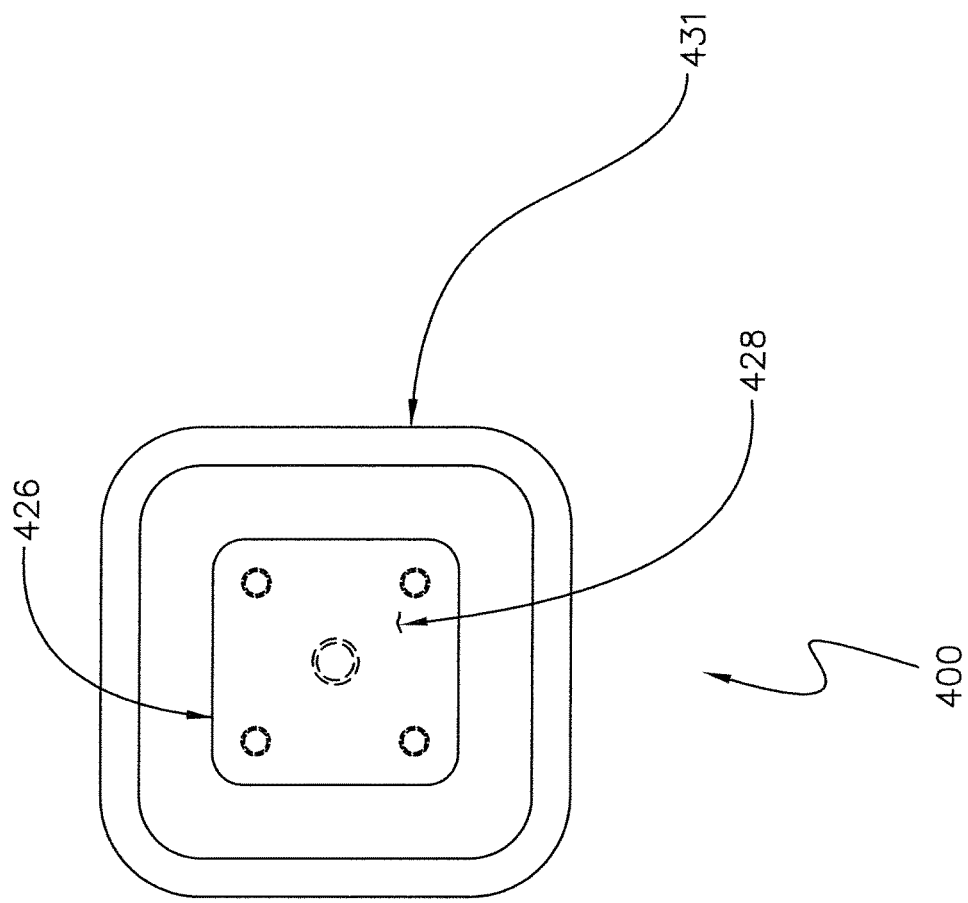
FIG. 17 is a rear elevational view thereof.

The best mode for carrying out the invention is presented in terms of its preferred embodiment, herein depicted within the Figures.

1. Detailed Description of the Figures

Referring now to FIG. 4 through 6, a protective sealing plug system for towing hitch receivers, generally noted as 100, is shown according to the preferred embodiment of the present invention. The system 100 is formed of a main body 101 for fittingly engaging within the cavity of a towing hitch receiver. The body 101 may be manufactured from a flexible material such as self-skinning molded urethane foam. Body 101 may also be produced from an extruded foam or a hot wire cut foam or other flexible material. The nature of the body 101 material may be so that it can retain oil or other corrosion inhibiting substances and hold them in place against the inside of the female receiver tube. A separate material 102 may further be integrated into the surface of the body 101 to retain corrosion inhibiting materials against the inside of the female receiver tube. The body 101 has interior cam surfaces 103 that interact with the cam surfaces 104 on an actuator rod 105 when the actuator rod 105 is rotated within the flexible body 101. The actuator rod 105 may be molded or machined from one piece with an integral retaining ring 109. During assembly, the actuator rod 105 is pushed through the flexible body 101 until the retaining ring feature, which is slightly larger than the interior of the body exits the far end of the body, locking the actuator rod 105 into the body 101. This retaining feature may be located at an alternate position within the assembly. Logo surfaces 107 and finger grabs 108 or rotation tool features 110 can be integrated into the actuator rod 105. A special rotation tool (not shown) such as a spanner wrench may be used to engage with the rotation tool features 110. Requiring a special tool to rotate the actuator rod may be used to prevent tampering and theft of the plug assembly.

Rotation of the actuator rod 105 causes its cam surfaces 104 to interact with the cam surfaces 103 of the body 101 and expand the molded body 101 outwards. Surface 106 acts as a detent to lock the cam surfaces 104 of the actuator rod 105 in place to prevent the actuator rod 105 from rotating backwards or over rotating.

When installed in the female hitch receiver and the actuator rod 105 is rotated, the expansion of the resilient body will seal the female receiver tube and prevent the ingress of water, dirt or other damaging elements. Rotating the actuator rod in the opposite direction will cause the flexible body to retract, allowing removal from the receiver hitch.

Referring now to FIG. 8 and FIG. 9, a self-lubricating storage container, generally noted as 200, is provided for the hitch plug assemblies 100 described herein. The container body 211 has an inner liner 212 constructed of a porous foam or similar material that is impregnated with a suitable lubricant or rust inhibitor 213. When the protective hitch plug 100 is removed from the hitch receiver, it is inserted into the cavity 214 where it comes into contact with the lubricant that is subsequently transferred to the surface of the protective hitch plug. The protective container is then closed and allows for clean and easy storage until it is needed.

A preferred design for the container would have the container body 211 constructed from a clear extruded plastic. The two end caps 215 may be used to enclose each end, and may be dip-molded and designed to fittingly engage on the ends of the container body 211. The container body 211 may be constructed from Poly Vinyl Chloride or a similar material. A pair of mounting brackets 216 may be affixed, incorporated or extended from the housing in order to provide convenient attachment for the container to a hitch or elsewhere.

Referring now to FIG. 10 through FIG. 13, a second alternative design for the sealing plug, generally noted as 400, is provided where the body 426 is constructed of a series of aligned segment elements 426a each formed of a flexible material as previously described in the preferred embodiment of the invention. While the use of a unitary formed body 101 can provide the necessary functionality, namely, providing an expanding outer surface when compressed such as to seal against the inside of the female receiver tube, such an configuration has the tendency to expand radially outward to a greater degree about the middle of the body 101, thereby creating a greater sealing force about the middle than compared to either the proximal or distal end. It has been further found that by using a plurality of individual segment elements 426a in a stacked arrangement to form the body 426, during compression along the linear centerline each individual segment element 426a will compress and expand radially such as to form multiple radially directed bulges along the linear length of the body 426 and thereby create a more uniformed sealing force from the proximal end to the distal end and through the middle.

By way of example, and not meant as a limitation, an alternate compression mechanism is further shown that provides a compression to create the expandable sealing action along the body 426. Once manner is to use a rod 427, with an integral stop plate 428. The rod 427 may extend through the flexible body 426 and each individual segment element 426a. As shown best in conjunction FIG. 12, the segment elements 426a may include an alignment mechanism or segment coordination mechanims, shown in greater detail herein as a notch 426b formed on one side of each segment element 426a to receive and restrain an alignment detent 426c. When aligned over the rod, such a male/female locking feature cause the individual segments 426a to coordinate in a manner similar to a singular, contiguous body 101 as described above.

To further allow the creation of a sealing compression force upon actuation, an over center acting toggle cam 429 when rotated about pivot pin 430 draws the rod 427 towards the back up plate 431 causing the flexible body 426, and especially the plurality of individual segment elements 426a, to each expand and seal against the interior of the female hitch receiver tube. The rod 427 and flexible body 426 may contain necked down features 432 and multiple pivot pin holes 433 or perforations 434 that allow the rod 427 and flexible body 426 to be torn down or broken off to the length required for the specific trailer hitch receiver tube length.

Referring now in conjunction with FIG. 14 through FIG. 17, an alternate variant of the second alternative design as described above is shown. The main variation herein of the coordination mechanism is the replacement of the male/female location and alignment features (i.e. 426b/426c) with at least one guide pin 437 that threads through the series of individual segment elements 426a. Such a variation provides an example of an alternate mechanism for maintaining the main body 426 as a coordinated structure of individual segments 426a. As such, one or more guide pins 437 replace the coordinating notch 426b and alignment detent 426c features.

Figure 18:
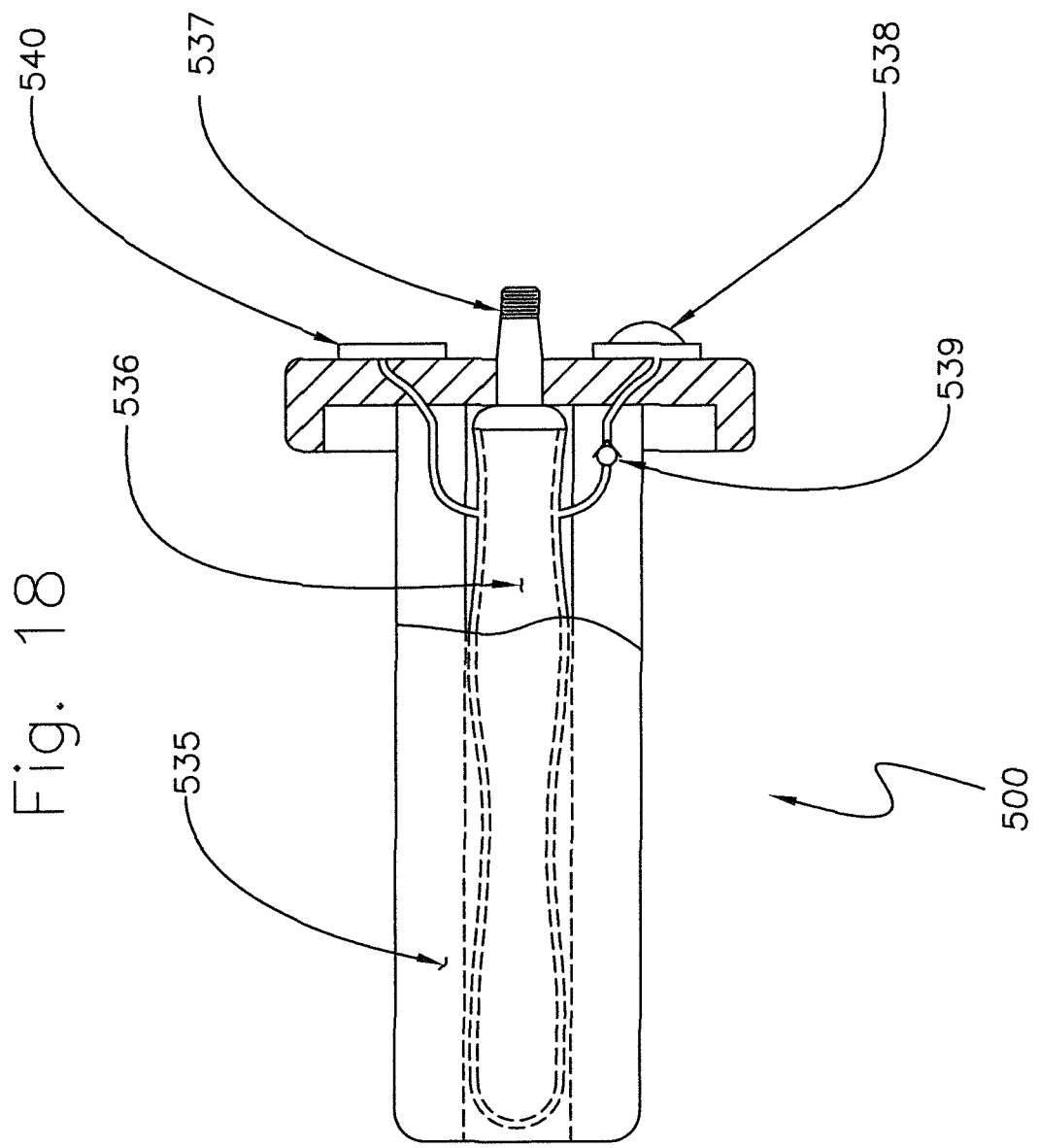
FIG. 18 is a side cross sectional elevational view of a protective sealing plug system for towing hitch receivers according to a second alternate embodiment of the present invention.
Figure 19:
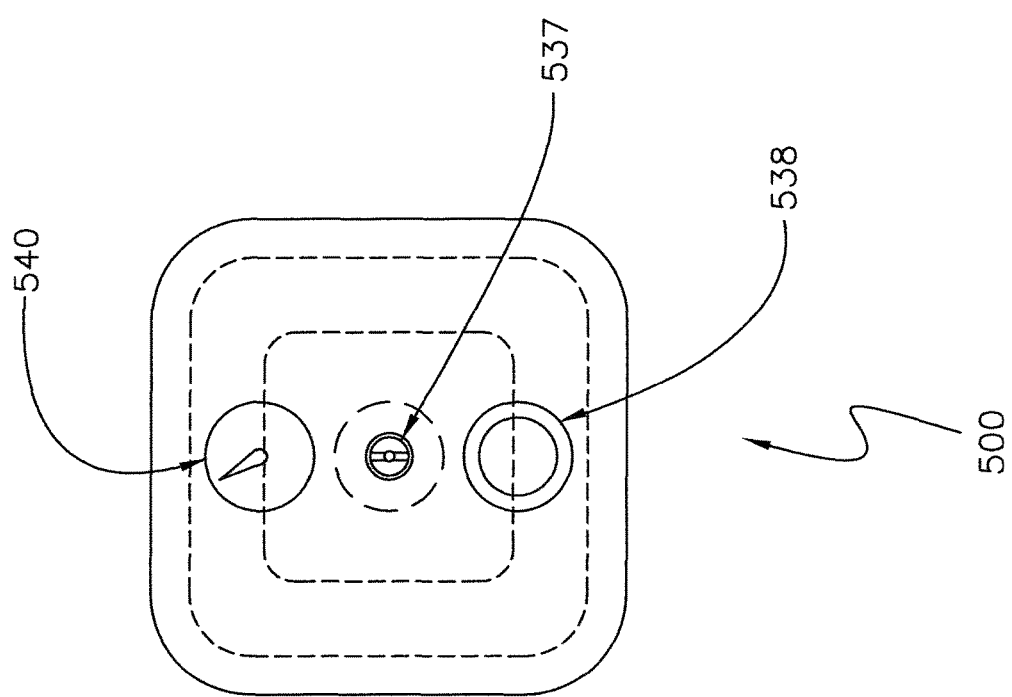
FIG. 19 is a front elevational view thereof.
Figure 20:
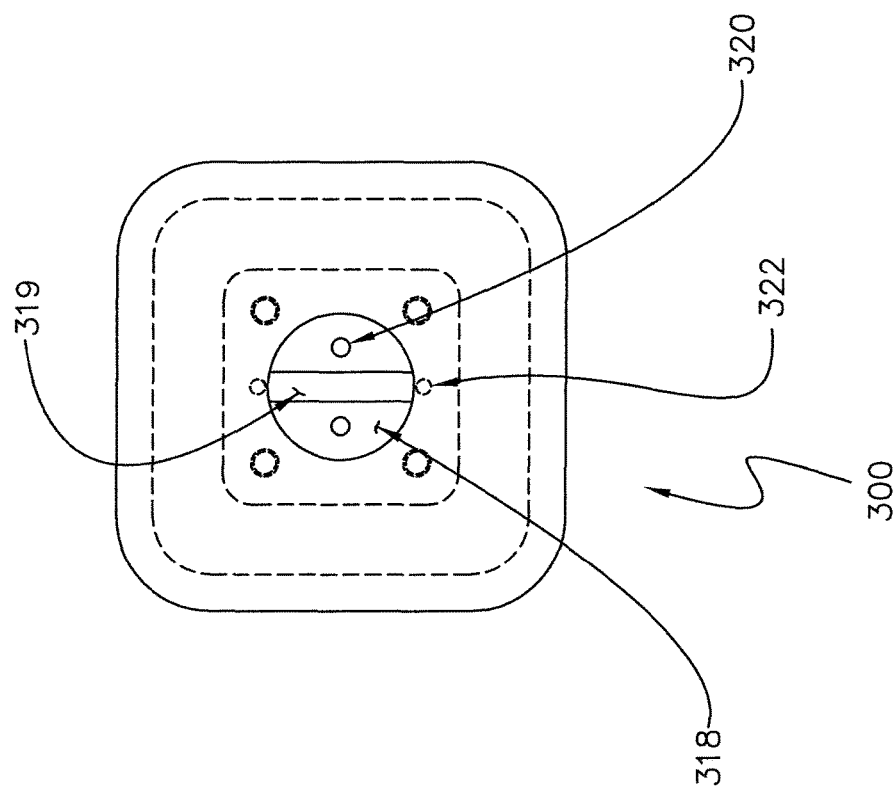
FIG. 20 is a front elevational view of a protective sealing plug system for towing hitch receivers according to a fourth preferred embodiment of the present invention.
Figure 21:
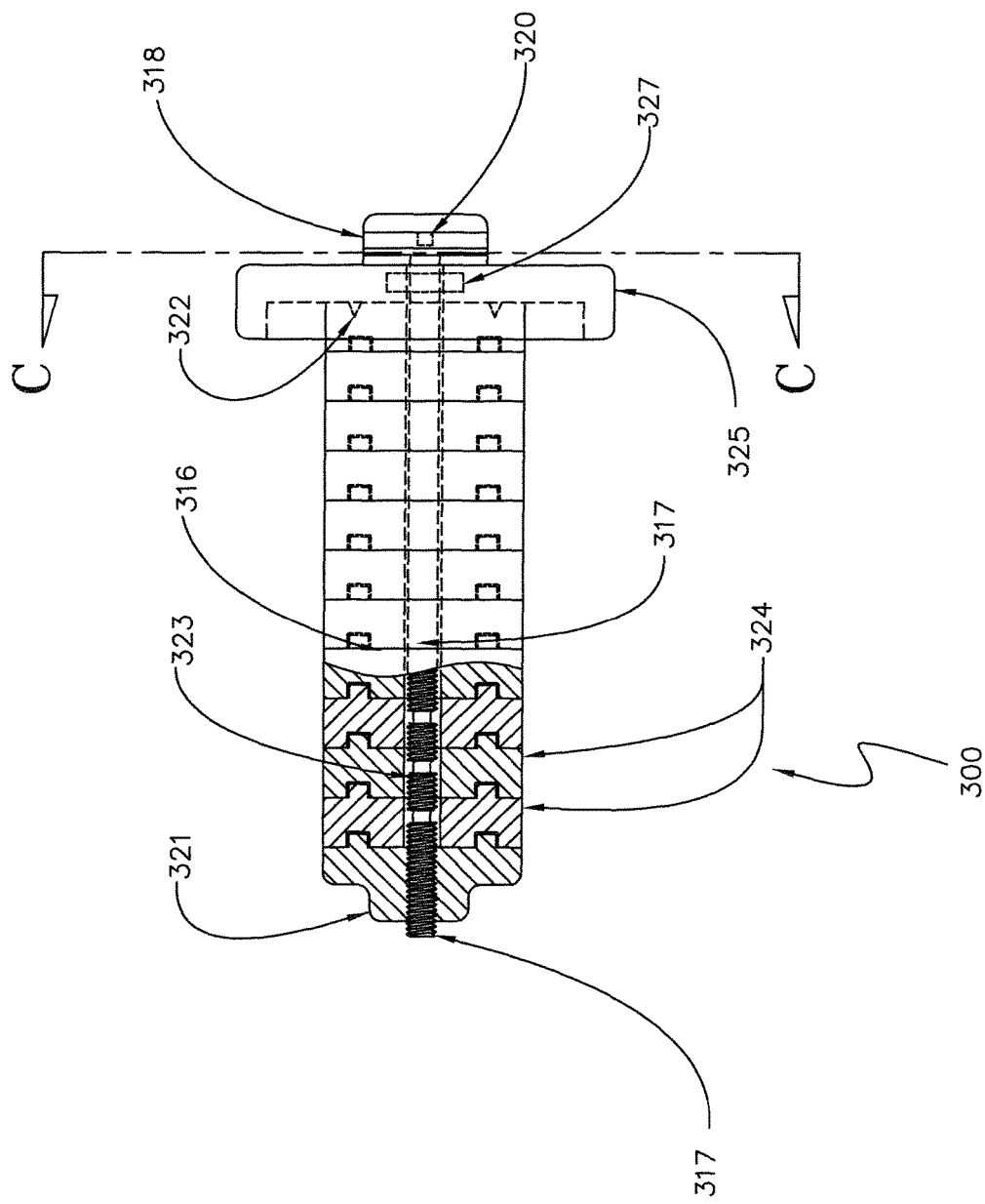
FIG. 21 is a side elevational view thereof.
Figure 22:
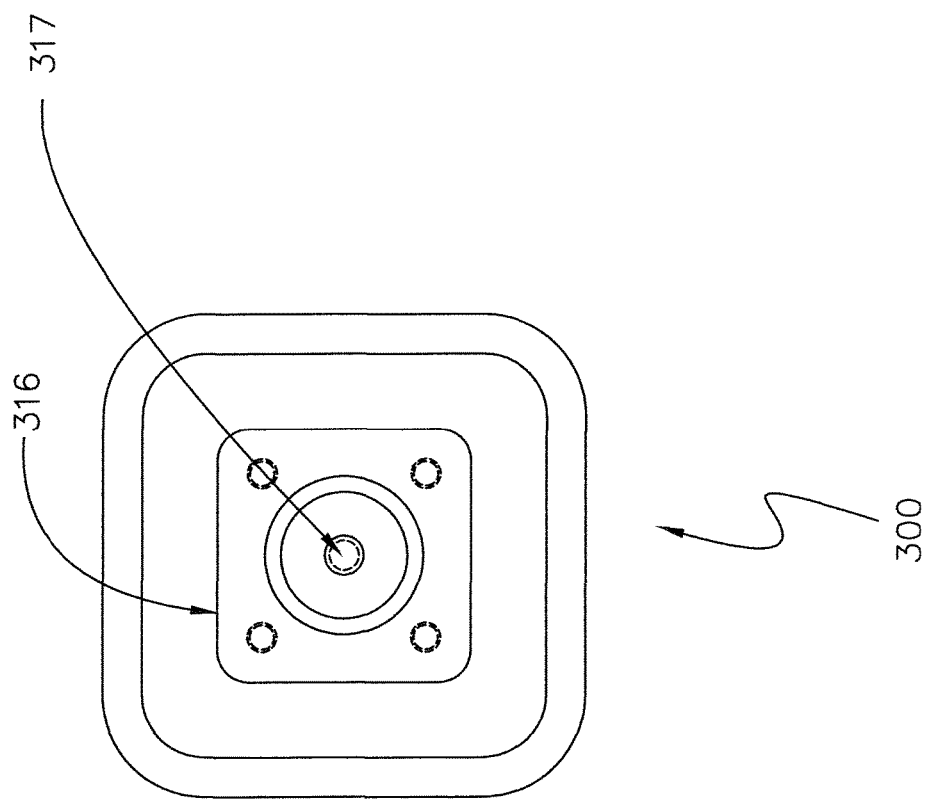
FIG. 22 is a rear elevational view thereof.
Figure 23:
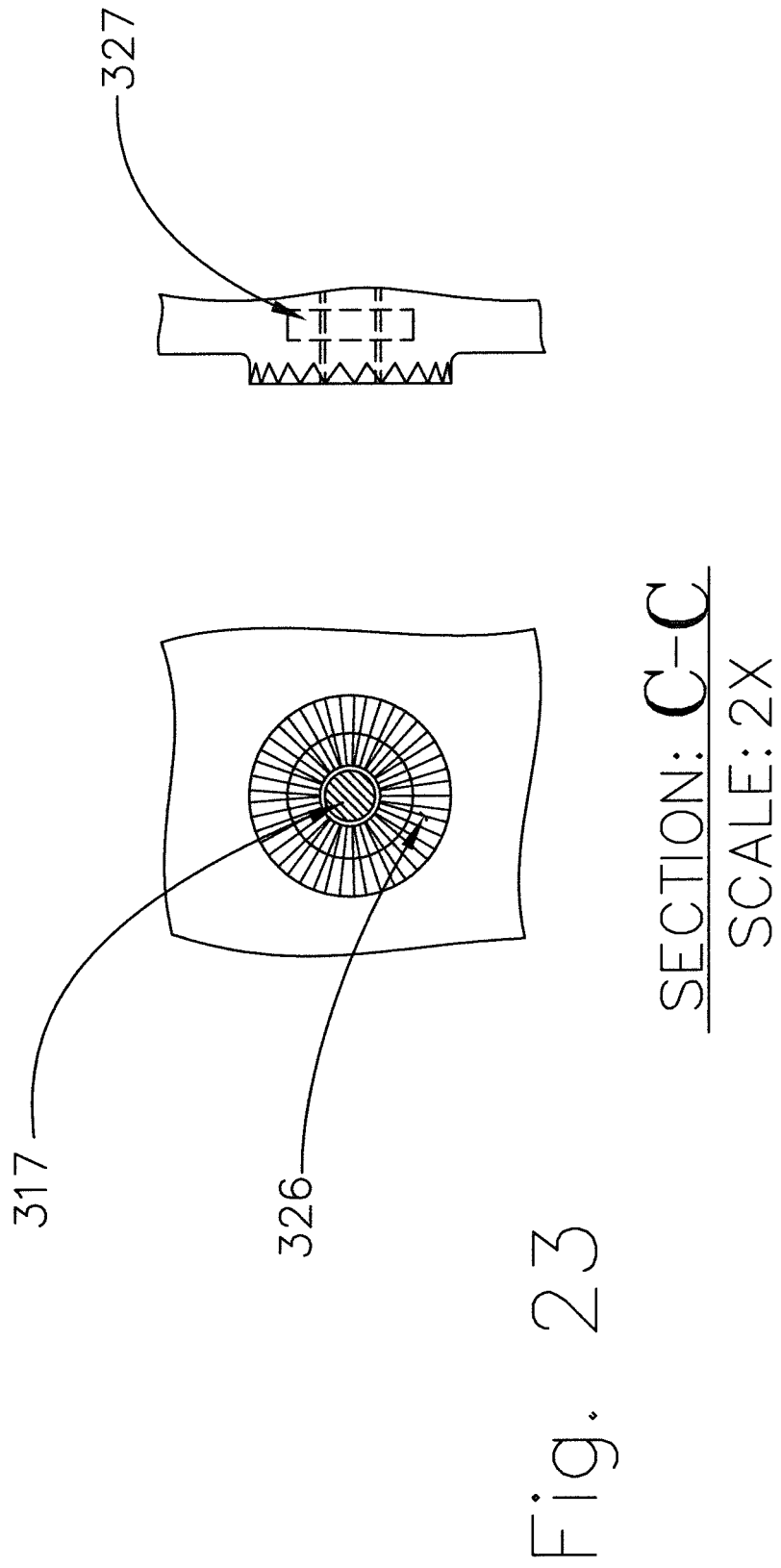
FIG. 23 is a cross sectional view taken along line C-C of FIG. 21.
Figure 24:
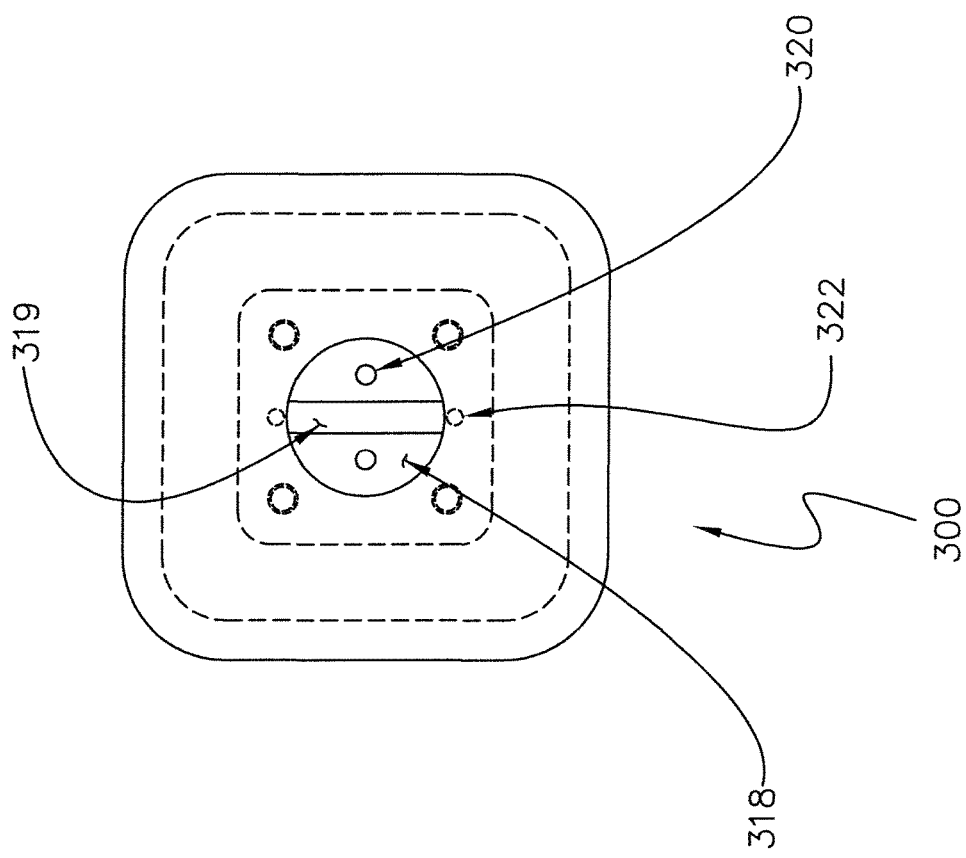
FIG. 24 is a front elevational view of a protective sealing plug system for towing hitch receivers according to an alternate variation of the fourth preferred embodiment of the present invention.
Figure 25:
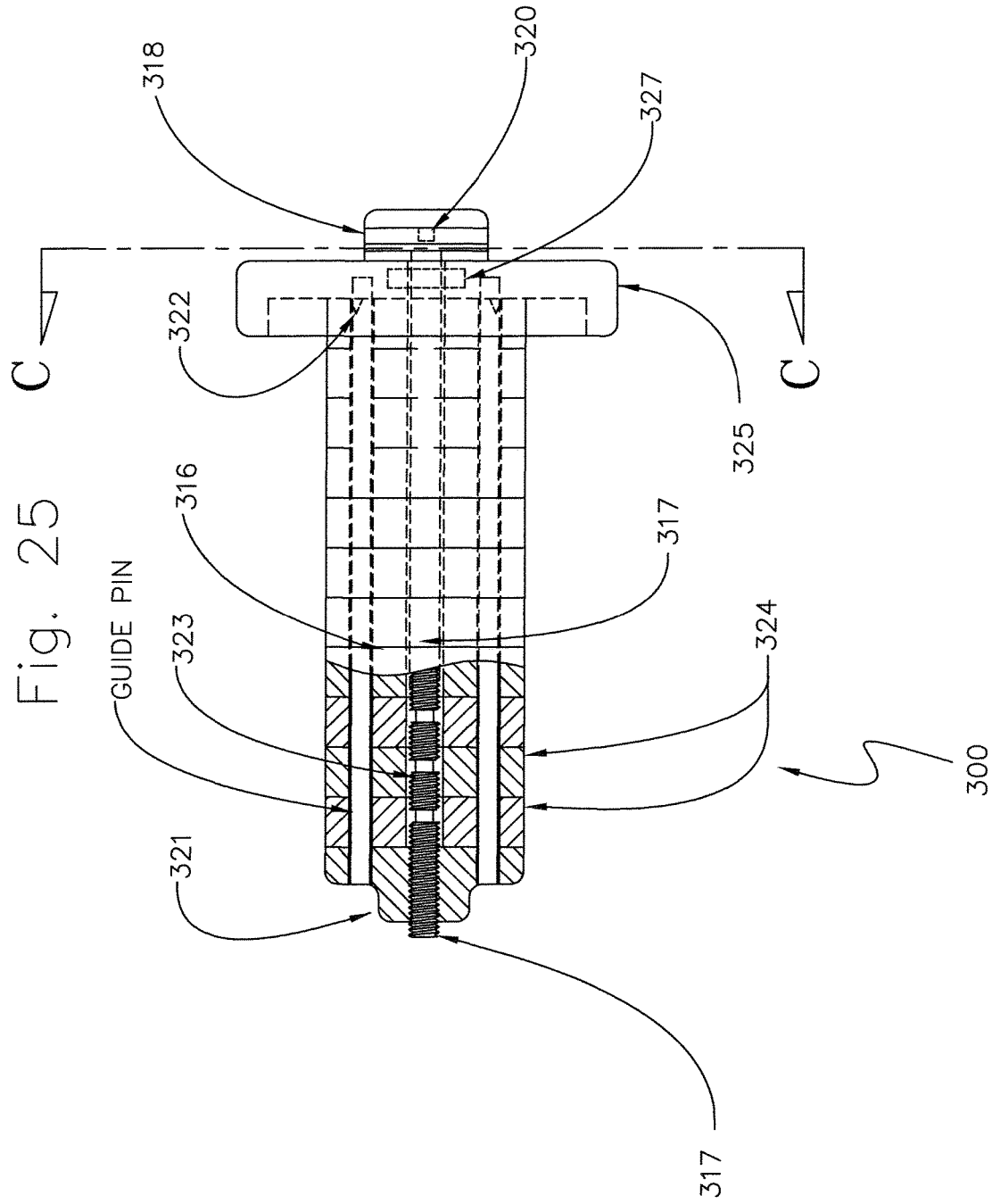
FIG. 25 is a side elevational view thereof.

Referring now to FIG. 18 and FIG. 19, a third alternate embodiment for the sealing plug, generally noted as 500, is shown where the body 535 constructed of a flexible material as previously described in the preferred embodiment of the invention. An air bladder 536 is inflated to expand the flexible body 535, causing it to seal against the interior of the female hitch receiver tube. The air bladder 536 may be inflated by an external air compressor through a Schrader or other type valve 537. The air bladder may also be inflated by an integral bulb air pump 538 and releasable check valve system 539 built into the receiver plug. Additionally, an air pressure gauge 540 may be incorporated as viewable from the body 535 and in fluid communication with the bladder 536 to allow a user to visually identify proper functionality and securement of the sealing plug 535.

Referring now to FIG. 20 through FIG. 23, a fourth alternative design for the sealing plug, generally noted as 300, is shown as a variation of the embodiment of FIG. 10 through 13, where the body 316 is similarly constructed of a flexible material as previously described in the preferred embodiment of the invention. A threaded rod 317, with an integral knob 318 that contains finger grabs 319 or rotation tool features 320 extending through the flexible body and threads into the end nut plate 321. The nut plate 321 may have spikes 322 or other features that penetrate into the flexible body 316 to prevent spinning when the threaded rod 317 is rotated. The threaded rod 317 and flexible body 316 may contain necked down features 323 or perforations 324 that allow the threaded rod 317 and flexible body 316 to be torn down or broken off to the length required for the specific trailer hitch receiver tube length. A thrust plate 325 which also contains anti-rotation features 322 is located between the body 316 and the knob 318. Ratcheting teeth or a ratcheting mechanism 326 located on the thrust plate 325 and the bottom of the knob 318 prevents the threaded rod from unscrewing. When the knob 318 is rotated, it turns the threaded rod 317 that in turn draws in the end nut plate 321 causing the flexible body 316 to expand and seal against the interior of the female hitch receiver tube. A torque limiting clutch 327 prevents over tightening of the threaded rod 317.

Referring now to FIG. 24 through FIG. 27, an alternate variation of the fourth alternative design shown above is provide. Therein, the ratcheting compression mechanism described in FIG. 20 through 23 above is shown with the variation of the embodiment of FIG. 14 through 17.

As should be now apparent to person having ordinary skill in the relevant art, in light of the present teachings, the various described embodiments are generally configured to provide an equivalent function, namely, the creating of sealing expansion when actuating a linear compression force upon the main insertion body.

2. Operation of the Preferred Embodiment

The primary feature of a trailer hitch receiver is that a female tube is designed to mate with a male ball mount bar. This male bar slides into the female tube of the hitch receiver and is secured with a hitch pin. The hitch pin slides through aligned holes in the male bar and female receiver, locking the components together. In any embodiment of the present invention, the towing hitch receiver is protected from obstruction and corrosion by insertion and retention of the protective sealing plug system for towing hitch receivers. The sealing body is held in place against the inside of the female receiver tube and provides a barrier to the intrusion of outside elements. A mechanism for urging the flexible material to compress slightly and, in the process, expand slightly allows the main body to be engaged within the hitch receiver in a manner that both prevents access by outside elements, but also prevents egress of the main body from the hitch receiver until desired by the user. When installed in the female hitch receiver, the expansion of the resilient body will seal the female receiver tube and prevent the ingress of water, dirt or other damaging elements. Retraction of the resilient body will cause the flexible body to retract, allowing removal from the receiver hitch. The ability to discharge lubricant into the inside surface of the hitch receiver further allows the easier installation or withdrawal of the trailer hitch into and out of the receiver tube.

The foregoing descriptions of specific embodiments of the present invention are presented for purposes of illustration and description. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of *Warner-Jenkinson Company, v. Hilton Davis Chemical,* 520 US 17 (1997) or *Festo Corp. v. Shoketsu Kinzoku Kogyo Kabushiki Co.,* 535 U.S. 722 (2002), or other similar case law or subsequent precedent should not be made if any future claims are added or amended subsequent to this Patent Application.

What is claimed is:

1. A protective sealing plug system for towing hitch receivers having a female tube for mating with a male ball mount bar and secured by a hitch pin which slides through aligned holes formed in the male bar and female receiver, respectively locking the male bar within the female receiver, said protective sealing plug system comprising:
   a main body for fittingly engaging within a cavity of the female tube of a towing hitch receiver, said main body formed of a resilient or flexible material and said main body further having an overall length to nest within said female tube past hitch pin receiving holes formed within the female receiver;
   said main body formed of a plurality of aligned, individual segments;
   a compression device for compressing a length of the resilient or flexible material slightly along a linear centerline and, in the process, expand slightly radially outward to allow the main body to be engaged within the hitch receiver in a manner that both seals said female tube and prevents egress of the main body from the hitch receiver until desired by a user; wherein said main body is thereby retained within said cavity without the need for additional fasteners or pins for mechanically penetrating said towing hitch receiver, wherein the compression device for compressing the resilient or flexible material to compress slightly further comprises:
   a threaded rod having integral knob at a first end and extending through the flexible body;
   an end nut plate for attachment to a second end of said threaded rod;
   features for penetrating into the flexible body to prevent spinning when the threaded rod is rotated;
   a thrust plate located between the body and the knob; and
   a ratcheting mechanism located on the thrust plate and a bottom of the knob for preventing said threaded rod from unscrewing;
   wherein when the knob is rotated, said knob turns the threaded rod that in turn draws in the end nut plate causing the flexible body to compress along the linear centerline and to expand and seal against an interior of the female hitch receiver tube.

2. The system of claim 1, wherein said main body segments are each formed of a self-skinning molded urethane foam.

3. The system of claim 1, wherein said main body segments are each formed of an extruded foam or a hot wire cut foam material.

4. The system of claim 1, wherein said body material retain oils or other corrosion inhibiting substances against an inside surface of a female receiver tube of the towing hitch receiver.

5. The system of claim 1, further comprising:
   a self-lubricating storage container.

6. The system of claim 5, wherein said self-lubricating storage container comprises:
   a container body having an inner liner of a material that is impregnated with a lubricant or rust inhibitor; and
   two end caps used to enclose each end of said container body.

7. The system of claim 6, wherein said container body is constructed from a clear extruded plastic.

8. The system of claim 1, wherein said threaded rod forms a necked down feature and said flexible body forms perforations to allow the threaded rod and flexible body to be torn down or broken off to a length required for the specific trailer hitch receiver tube length.

9. The system of claim 1, wherein upon compression along the linear centerline each said plurality of aligned, individual segments expands radially outward.

10. The system of claim 9, further comprising a coordination mechanism maintaining an alignment of said plurality of aligned, individual segments during compression.

11. The system of claim 10, wherein said coordination mechanism comprises:
   at least one alignment hole formed by each said individual segment; and
   an alignment rod;
   wherein when said alignment rod is threaded through an alignment hole of each individual segment, a laminated body structure is formed causing said individual segments to coordinate in a manner to form a contiguous body.

12. The system of claim 11, wherein said coordination mechanism further comprises:
   more than one said alignment hole formed by each said individual segment; and
   more than one alignment rod, one each alignment rod for threading through one each alignment hole formed by each individual segment.

13. A, protective sealing plug system for towing hitch receivers having a female tube for mating with a male ball mount bar and secured by a hitch pin which slides through aligned holes formed in the male bar and female receiver, respectively locking the male bar within the female receiver, said protective sealing plug system comprising:

a main body for fittingly engaging within a cavity of the female tube of a towing hitch receiver, said main body formed of a resilient or flexible material and said main body further having an overall length to nest within said female tube past hitch pin receiving holes formed within the female receiver;

said main body formed of a plurality of aligned, individual segments;

a compression device for compressing a length of the resilient or flexible material slightly along a linear centerline wherein upon compression along the linear centerline each said plurality of aligned, individual segments expands radially outward and, in the process, expand slightly radially outward to allow the main body to be engaged within the hitch receiver in a manner that both seals said female tube and prevents egress of the main body from the hitch receiver until desired by a user;

wherein said main body is thereby retained within said cavity without the need for additional fasteners or pins for mechanically penetrating said towing hitch receiver wherein a coordination mechanism comprises:

each said individual segment forming a receiving notch on a first side; and each said individual segment forming an alignment detent on a second side;

said first side being opposite said second side; and the coordination mechanism maintaining an alignment of said plurality of aligned, individual segments during compression;

wherein when said alignment detent of a first individual segment is placed within a receiving notch of a second and adjacent individual segment that forms a male/female locking feature and causes said individual segments to coordinate in a manner to form a contiguous body.

* * * * *